Figure 1:
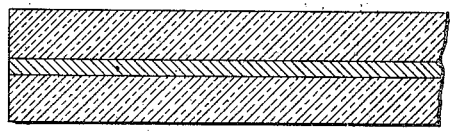

March 19, 1929.   L. BARTELSTONE   1,705,631

WEATHERPROOF LAMINATED GLASS

Filed Oct. 26, 1927

Inventor
Louis Bartelstone
By Attorney
Nathan & Bowman

Patented Mar. 19, 1929.

1,705,631

UNITED STATES PATENT OFFICE.

LOUIS BARTELSTONE, OF BROOKLYN, NEW YORK, ASSIGNOR TO INDESTRUCTO GLASS CORPORATION, OF FARMINGDALE, NEW YORK, A CORPORATION OF NEW YORK.

WEATHERPROOF LAMINATED GLASS.

Application filed October 26, 1927. Serial No. 228,981.

This invention is devoted to permanentizing a well-known article of commerce, to wit, so-called "laminated glass". This product is composed of two or more sheets of glass bonded to one or more intervening sheets of celluloid.

In manufacturing this composite product, a remarkable adhesion of the contacting sheets can now be established through modern methods; the adhesion being inherently capable of permanently retaining its full strength and uniformity save at its margins where the celluloid is unprotected by the glass. It may be noted, in this connection, that in the finishing step, it is usual to grind and, in some cases to polish, the edges to improve the appearance and to obtain accurate dimensions. Accordingly, at the edges of the laminated sheet, the edge of the celluloid, through the normal course of manufacture, terminates flush with those of the glass.

When that product is put to certain industrial uses (for example as automobile wind-shields) it has been observed that a deterioration starts very slowly at the edges and very slowly extends inwardly; producing a defective margin of low adhesion and frequently of impaired optical appearance.

In an attempt to arrest this action, it has been customary to subject the composite sheet (the manufactured laminated glass) to a subsequent operation, to wit, to paint or varnish the flush-ground edges and margins with a water-proofing film. This, however, has not proven to have been an effective remedy for the difficulty for various reasons. The coating had to be thin because purely superficial and it had to be applied over the entirely exposed flush edges and exterior marginal region. Hence it was necessarily so located as to receive the full brunt of wear and impact, not only during transportation and handling, but likewise after being set in the frame of the wind-shield where it is exposed to a continual free-playing.

It has heretofore been supposed that traces of moisture creeping from the outside towards the inside were responsible for the spoilage, but I have discovered that the spoilage can be attributed to another cause, to wit:— evaporation of certain component parts of the celluloid itself causing a local shrinkage of the sheet at its marginal portions. The action is accumulative as the initial shrinkage produces a microscopic separation and opens the way for a further evaporation, etc.

This invention now proposes to overcome those objections by subjecting the edge-grounding manufactured product to a novel step in the nature of a specialized inlaying operation. That is to say, the glass is first laminated in an approved manner; resulting in a product having the edges of the celluloid exposed. The celluloid edging is then grooved away by a counter-sinking operation with the two-fold object of distancing the edging of celluloid from that of the glass, and of providing an elongated groove-like moat between the margins of the glass plates in the nature of a shielding housing for receiving a celluloid-protecting composition.

Figure 2:
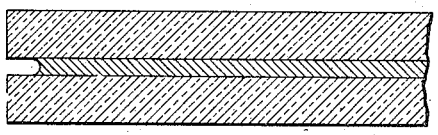
Figure 3:
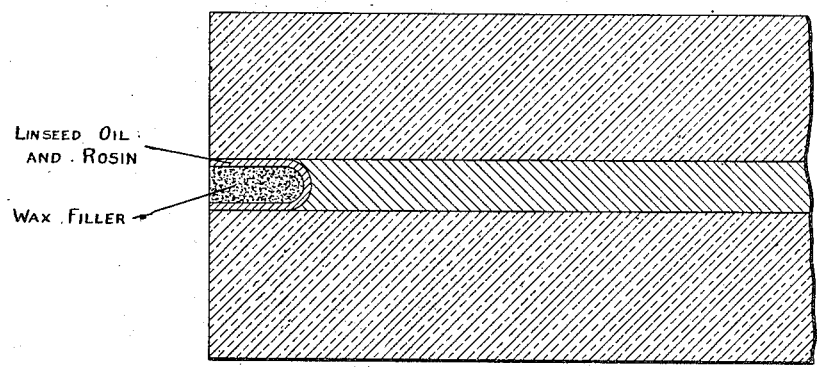

In the drawings, forming a part of this disclosure, Figure 1 is a sectional view of a portion of a sheet of laminated glass. Fig. 2 is a similar view showing the marginal portion of the intermediate lamina removed to form a channel. Fig. 3 is a similar view on an enlarged scale, but showing the channel lined and filled in accordance with the present invention.

In performing the grooving, advantage is taken of the nature of laminated glass; to wit, that the two panes of glass are spaced apart a few (say 20) thousandths of an inch by the intervening sheet of celluloid which normally completely fills the space therebetween. The marginal removal of the celluloid admits, therefore, of being readily removed to a depth of abut a sixteenth of an inch; a narrow chisel-like strip of steel being manipulated after the manner of a rabbeting plane. The glass sides will be found of aid as guides for the point of the tool so that a thread-like marginal portion of the celluloid may be scraped away quite readily to the depth required; leaving an elongated channel bounded at its bottom by the concaved edge of the diminished sheet of celluloid and bounded at its sides by the now-protruding rim-like margins of the undiminished planes of glass. This groove may be formed partly or wholly around the circumference of the laminated sheet according to its contemplated mounting.

Having thus preformed the article, the weather-proofing may be applied. For that purpose, any good water-resisting varnish may be used. Linseed oil is an excellent agent. The groove will be filled with the liquid and the exposed edges of the glass coated therewith. As it dries, the liquid shrinks and forms, if free from pigment or color, a transparent inconspicuous closely adhering skin forming a complete lining for the groove. After the liquid has sufficiently hardened, the remaining unfilled portions of the channel may be loaded with any suitable filler to protect the water-proof skin and keep the channel from accumulating dirt. This filler may carry a tint (as for example red lead) and thus give the ornamental effect of a marginal stripe around the edges of the laminated sheet.

As a result of much investigation, involving long periods of testing, it has been concluded that the coating agent most suitable for this purpose can be made by the admixture of equal parts: 1st of rosin dissolved in turpentine, 2nd of boiled linseed oil, and 3rd of commercial japan drier. This forms a fluid that may be very readily brushed into the pre-formed groove and it will soon harden sufficiently to seal that groove effectively against internal evaporation of the celluloid and external admission of moisture. As a supplemental filler, it has been found that paraffin wax dissolved in turpentine is excellent as it admits of being readily flown into the groove to intimately fill all parts thereof and amalgamate superficially but well with the already applied coating. After the excess of the turpentine has evaporated, the wax retains its plastic qualities and hence has no tendency to crack open. Shoe-maker's wax is also practicable, as well as pitch or liquid asphaltum; but the special compounds above detailed are deemed preferable.

A virtue peculiar to this construction is that it is proof against abrasion; the weather-proofing agent being physically sheltered by the glass and beyond reach, so to speak. Consequently the film cannot be broken by handling, will not be impaired by resting the edges of the heavy laminated sheet upon rough supports, and will not become worn away by the weaving of such a sheet in its frame.

A distinct advantage of this method of weather-proofing, and of the structural characteristics of this invention, is that it is universally applicable to all types of laminated glass now available on the market so that a purchaser of that product by utilizing this invention can subject the same to a treatment that will effectively arrest marginal deterioration.

Having thus revealed this invention, I claim as new and desire to secure the following combinations and elements, or equivalents thereof, by Letters Patent of United States:—

1. An age-proofed sheet of laminated glass comprising an intervening sheet of organic material and external panes of glass, the edges of the intervening sheet being spaced inwardly from those of the glass to form a narrow elongated channel; a weather-resisting film covering the edge of the sheet and the inner surfaces of the protruding margins of the glass panes; and a channel-filler of a plastic nature.

2. A method of age-proofing a sheet of laminated glass which consists in providing a narrow elongated channel between the inner lamina and the rim-portions of the outer laminæ; applying to the bottom and side-walls of said channel a film-forming liquid; and subsequently filling the residual channel with a normally plastic agent dissolved in turpentine.

3. A permanentized sheet of laminated glass comprising an intervening sheet of organic material and external panes of glass, the edges of the intervening sheet being spaced inwardly from those of the glass to form a narrow channel; a film of linseed oil and rosin covering the edge of the sheet and the inner surfaces of the protruding margins of the glass panes; and a wax filler for the residual channel.

4. A method of permanentizing a sheet of laminated glass which consists in providing an elongated thread-like groove between the inner lamina and the rim-portions of the outer laminæ; applying amalgamated rosin and linseed oil to the bottom and side-walls of said channel; and filling the residual channel with wax softened with turpentine.

In witness whereof, I have hereunto subscribed my name.

LOUIS BARTELSTONE